United States Patent [19]

Nordstrom

[11] Patent Number: 4,462,493
[45] Date of Patent: Jul. 31, 1984

[54] ROLLER RAIL ASSEMBLY FOR CARGO LOADING SYSTEM

[75] Inventor: Arnold B. Nordstrom, Torrance, Calif.

[73] Assignee: Ancra Corporation, El Segundo, Calif.

[21] Appl. No.: 426,743

[22] Filed: Sep. 29, 1982

[51] Int. Cl.³ ............................................. B65G 13/11
[52] U.S. Cl. .................................. 193/35 R; 410/92; 414/532
[58] Field of Search ................. 193/35 R, 35 C, 35 J, 193/37; 410/79, 92, 94, 105; 414/532

[56] References Cited

U.S. PATENT DOCUMENTS

| 3,381,921 | 5/1968 | McDonough et al. | 410/79 |
| 3,422,508 | 1/1969 | Higuchi | 410/105 |
| 4,239,100 | 12/1980 | Corey | 193/37 X |

Primary Examiner—Jeffrey V. Nase
Assistant Examiner—Daniel R. Edelbrock
Attorney, Agent, or Firm—Edward A. Sokolski

[57] ABSTRACT

A roller rail assembly for a cargo loading system for loading cargo-loaded pallets into a vehicle, such as an aircraft. The roller rail assembly is removably mounted in a track or channel assembly having alternate cutout portions and lip portions. The roller rail assembly includes an elongated rail member which has a tension stud extending substantially normally from the main body of the assembly along the bottom edge thereof, and a support shoulder extending from the main body of the assembly substantially normally thereto above the tension stud and in a substantially opposite direction thereto. Mounting blocks and axles are provided for rotatably mounting pairs of rollers on the main body of the assembly, the rollers being positioned on opposite sides of the track for rotation on an axis substantially normal to the longitudinal axis of the track. The rail is removably supported in the track with the tension stud fitted underneath the lip portions of the track. A retainer member has a tension lug extending normally therefrom along the bottom edge thereof and a shear lug spaced above and running in substantially the same direction as the tension lug. With the tension stud of the rail installed under the lips along one side of the track, the retainer member is rotated to bring the tension lug thereof under the lip portions of the opposite side of the track and the shear lug thereof into one of the cutout portions of the track, the retainer member being bolted to the rail in this installed position.

7 Claims, 5 Drawing Figures

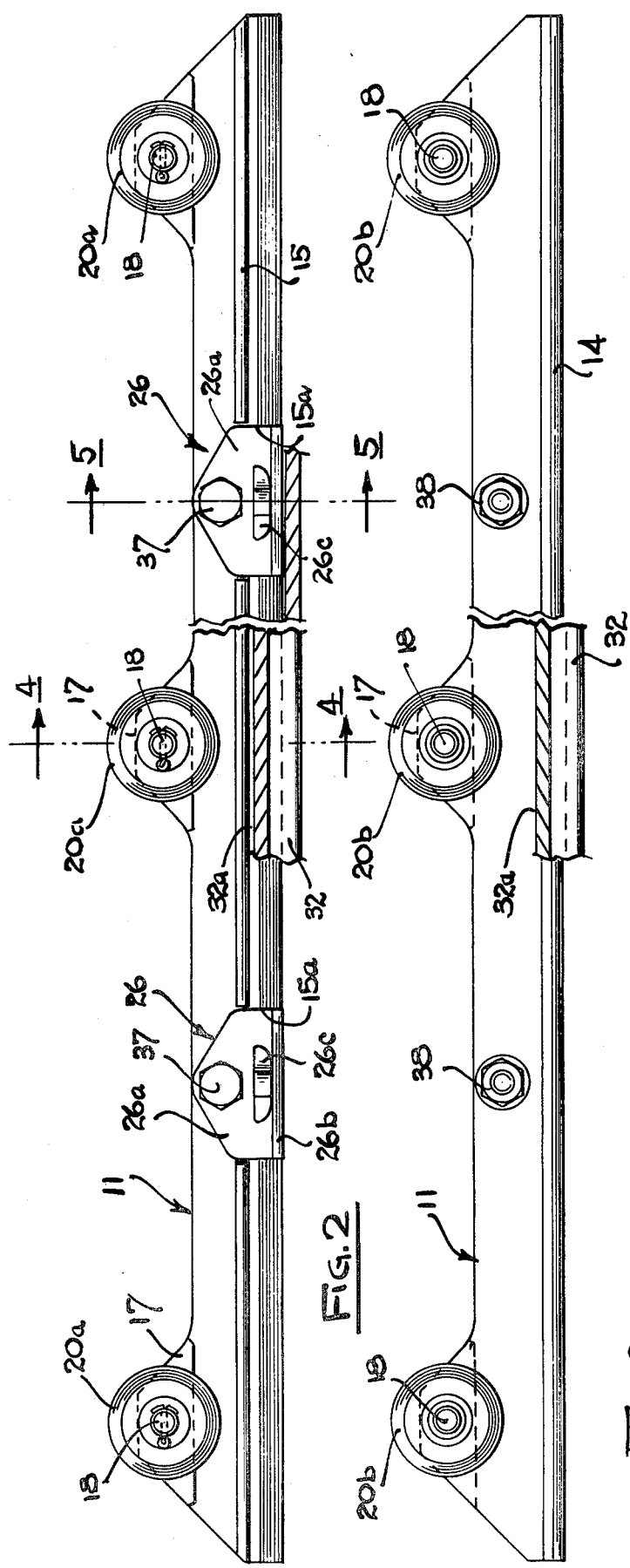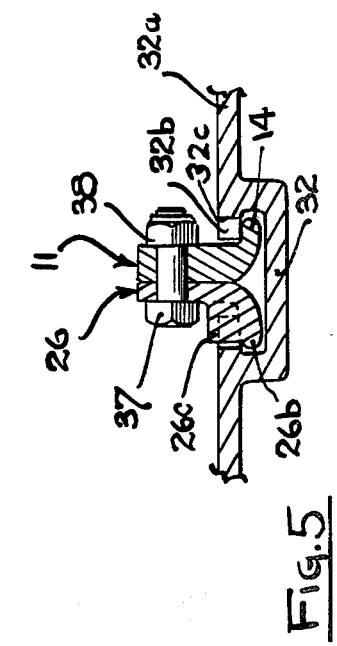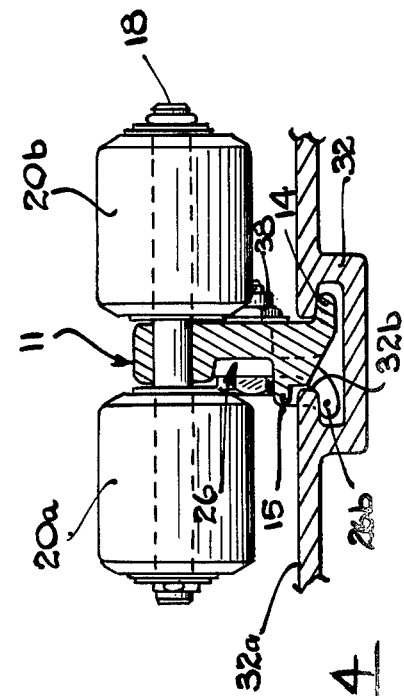

ROLLER RAIL ASSEMBLY FOR CARGO LOADING SYSTEM

This invention relates to cargo loading systems for loading palletized cargo into a vehicle such as an aircraft, and more particularly to a roller rail assembly for use in such a system.

A number of systems have been developed in the prior art for facilitating the loading and unloading of palletized cargo onto and from vehicles such as aircraft. A typical such system is described in U.S. Pat. No. 3,480,239 to Jensen et al., issued Nov. 25, 1969. A roller assembly is shown in connection with FIGS. 2 and 3 of this patent for facilitating the movement of a pallet into position along the loader. This roller assembly is mounted in a track having alternate lip and cutout portions by means of a plunger device which operates in conjunction with a spring mechanism.

The roller rail assembly of the present invention provides distinct advantages over that of the prior art in that it eliminates the need for moving parts such as springs, actuated plungers and the like, and is of a simplified construction which is of less weight and can be fabricated for less cost than such assemblies of the prior art.

The improvement of the present invention is achieved by employing a rail member which supports the needed rollers transversely thereof and has a tension stud portion which extends normally therefrom along the bottom edge thereof, this tension stud fitting into the track under the lip portions on one side thereof. A support shoulder extends from the rail in a substantially opposite direction to the tension stud and at a position along the rail above the tension stud, this support shoulder running along the track above the lip portions on the side opposite to that where the tension stud is located. The rail assembly is retained to the track by means of a retainer member which has a longitudinally elongated tension lug and a shear lug of substantially less longitudinal extent than the tension lug, both of these lugs extending substantially in the same direction. With the tension stud of the rail installed under predetermined lip portions on one side of the track, the retainer member is rotated into a position such that the tension lug of the retainer is installed under the lip portions on the other side of the track, and the shear lug is inserted into a notch in the track between a pair of lip portions. The retainer member is then attached to the rail, thereby firmly retaining the rail to the track.

It is therefore an object of the invention to provide a removable roller assembly for a cargo loading system which is easier and less costly to fabricate than prior art such assemblies.

It is a further object of this invention to provide a roller rail assembly for use in a cargo loading system which is a lighter weight than prior art such assemblies.

Other objects of this invention will become apparent from the following description taken in connection with the accompanying drawings of which:

FIG. 2 is a side elevational view illustrating the preferred embodiment installed in a track;

FIG. 3 is a side elevational view of the preferred embodiment taken from the side opposite to that of FIG. 2;

FIG. 4 is a cross-sectional view taken along the plane indicated by 4—4 in FIG. 2; and FIG. 5 is a cross-sectional view taken along the plane indicated by 5—5 in FIG. 2.

Figure 1:
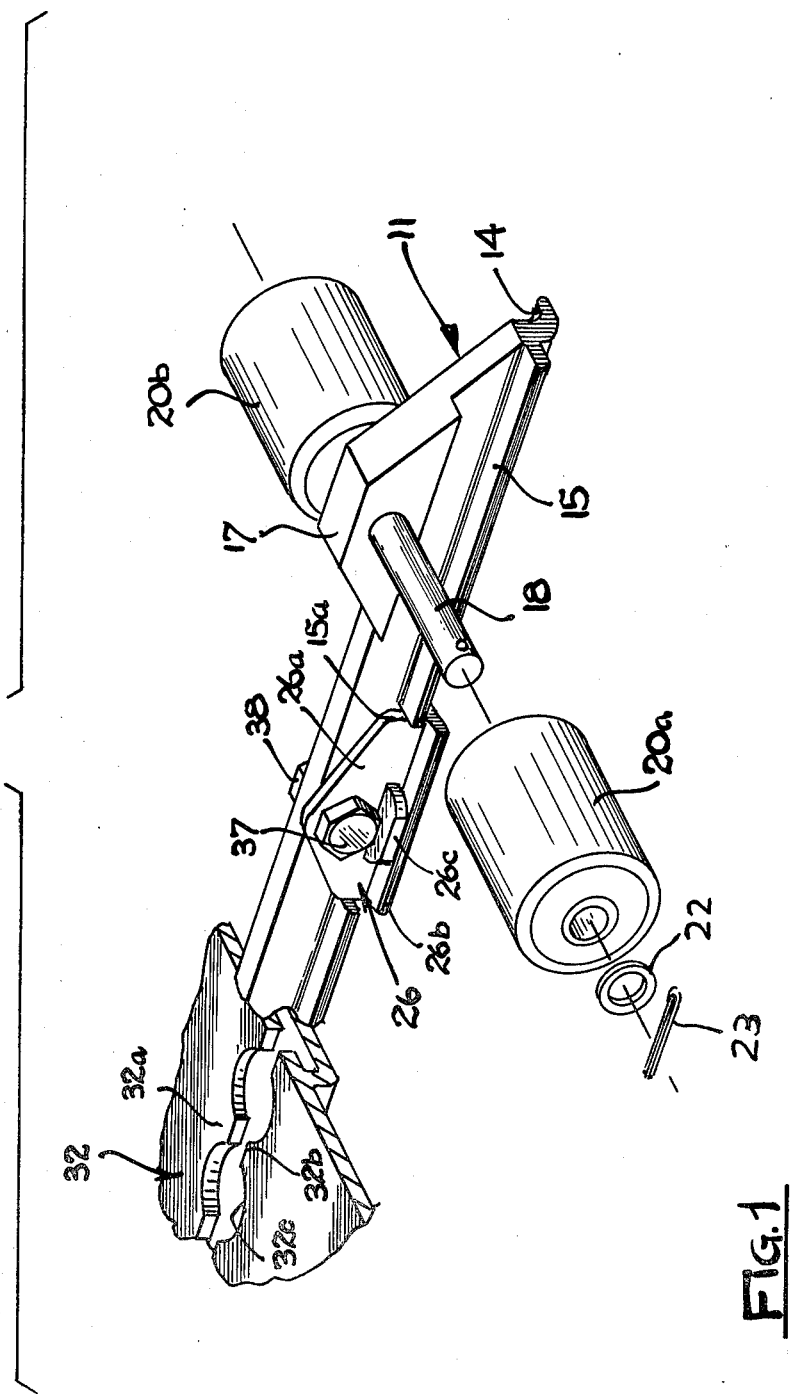
FIG. 1 is a perspective view illustrating a preferred embodiment of the invention installed in a track.

Referring now to the figures, a preferred embodiment of the invention is illustrated. Rail member 11 has an elongated tension stud or lip 14 which extends substantially normally therefrom along the bottom edge thereof. A support shoulder or lip 15 runs along the rail and extends normally therefrom in a direction substantially opposite to that of the tension stud; shoulder 15 being spaced from tension stud 14 towards the center of the rail and having its longitudinal and transverse axes substantially parallel to those of tension stud 14.

A plurality of mounting blocks 17 are located in spaced relationship along the top of the rail, each of these mounting blocks having an axle 18 fitted therethrough and fixedly supported thereon, the axles extending transversely outwardly from the opposite sides of the blocks. Rotatably supported on each of axles 18 is a pair of rollers 20a and 20b, these rollers being mounted in pairs on opposite sides of the rail and maintained on the axles by means of washers 22 and cotter pins 23.

Retainer member 26 has a main body portion 26a. An elongated tension lug 26b extends normally outwardly from the main body portion and runs longitudinally along the bottom edge thereof. A shear lug 26c extends normally from the main body portion of the retainer directly above and opposite tension lub 26b in substantially the same direction as the tension lug; shear lug 26c being substantially less in longitudinal extent than the tension lug. A plurality of roller assemblies 20a, 20b are typically supported on a single rail 11 as shown in FIG. 3.

The rail is installed in a track 32 in the following manner. The tension stud 14 of the rail is first inserted in position under the lip portion 32a on one side of the track with the shoulder or lip 15 running along the track directly opposite lip portions 32b on the opposite side of the track. There is a slot 15a cut in shoulder 15 near each of the opposite ends thereof inwardly of the end mounting blocks 17. A retainer member 26 is vertically rotated into position in each of the slots 15a with the tension lug 26b fitted under a number of lip portions 32b of the track and with shear lug 26c fitted in one of the cutout portions 32c of the track between a pair of the lip portions thereof. With the retainer in this installed position, the body portion 26a of the retainer is bolted to the rail by means of bolt 37 and nut 38. In this manner, the roller rail assembly is firmly retained to the track, yet can readily be removed therefrom when required.

While the invention has been described and illustrated in detail, it is to be closely understood that this is intended by way of illustration and example only and is not to be taken by way of limitation, the spirit and scope of the invention being limited only by the terms of the following claims.

I claim:

1. A roller rail assembly for use in loading cargo into a vehicle, said rail assembly being removably mounted in a track having alternate lip and cutout portions on opposite sides thereof comprising a rail member having a tension stud extending substantially normally therefrom along the bottom edge thereof and a support shoulder extending from the rail member in a direction substantially opposite to that of the tension stud and at a position along the rail above the tension stud, roller means for supporting the cargo, means for rotatably supporting the roller means on said rail member, and retainer means for retaining the rail member in said track comprising a main body portion, a tension lug and a shear lug extending normally from the body portion in substantially the same direction, the tension stud of the rail member being fitted in the track under the lip portions thereof on one side of the track with the support shoulder of the rail member running along the track above the lip portions on the other side thereof, the tension lug of the retainer means being installed under predetermined areas of the lip portions on the other side of the track with the shear lug installed in one of the cutout portions on the other side of the track, and means for removably attaching the main body portion of the retainer means to the rail member.

2. The roller rail assembly of claim 1 wherein the roller means comprises a plurality of pairs of rollers mounted on opposite sides of the rail member with their rotation axes transversely thereof.

3. The roller rail assembly of claim 2 wherein the means for supporting each of said pairs of rollers comprises a mounting block along the top of the rail member and an axle fitted through the block member and fixedly attached thereto, said axle extending transversely outwardly from the opposite sides of the block, the rollers being rotatably supported in the axle.

4. The roller rail assembly of claim 1 wherein the means for removably attaching the main body portion of the retainer means to the rail member comprises a bolt fitting through said main body portion and the rail member.

5. The roller rail assembly of claim 1 wherein the tension lug of the retainer means is elongated and extends longitudinally along the bottom edge of the main body portion and the shear lug of the retainer means is substantially less in longitudinal extent than the tension lug and is positioned directly above the tension lug.

6. The roller rail assembly of claim 1 wherein there is a slot being formed in the support shoulder of the rail, said retainer means being fitted into said slot.

7. The roller rail assembly of claim 1 wherein there are a pair of said retainer means, a slot being formed in the support shoulder of the rail near each of the opposite ends thereof, each of said retainer means being fitted into a respective one of said slots.

* * * * *